United States Patent Office 3,781,372
Patented Dec. 25, 1973

3,781,372
PROCESS FOR PURIFICATION OF
HEXACHLOROPHENE
Leon M. Polinski, North Plainfield, N.J., and Milton M. Sonn, Bronx, N.Y., assignors to Givaudan Corporation, Clifton, N.J.
No Drawing. Filed Apr. 13, 1971, Ser. No. 133,711
Int. Cl. C07c 37/22
U.S. Cl. 260—619 A                                                 9 Claims

ABSTRACT OF THE DISCLOSURE

There is provided a novel method of purifying hexachlorophene by removing therefrom unreacted trichlorophenol. The method comprises treating solutions of hexachlorophene contaminated with trichlorophenol which is a starting material in the process of manufacture of the principal product, with molecular sieves of predetermined pore size which selectively remove the trichlorophenol.

FIELD OF THE INVENTION

Removal of impurities by molecular sieves.

DESCRIPTION OF THE PRIOR ART 2,2'-methylene-bis (3,4,6-trichlorophenol) commonly and hereinafter referred to as hexachlorophene is known as a useful disinfectant which is widely used in soaps, detergents, and other cleaning materials for human skin. One of the principal impurities of hexachlorophene as produced by the known industrial processes is trichlorophenol which is an unreacted starting material. In order to produce U.S.P. quality hexachlorophene the trichlorophenol content must be brought down to less than about 5,000 p.p.m.

However, the incorporation of hexachlorophene meeting U.S.P. standards in cosmetic compositions such as soaps, spray deodorants and the like, has been found undesirable due to the odor for which the trichlorophenol is responsible. In order to produce hexachlorophene which will meet cosmetic purity specifications, it is necessary to reduce the trichlorophenol content to below 1,000 p.p.m. which is designated as the odor threshold.

The known processes for deodorizing hexachlorophene include recrystallization from organic solutions utilizing solvents such as toluene, ethylene dichloride, heptane, methanol, and the like. Steam deodorization and air or vacuum drying of powdered material is also employed, as is chemical treatment involving the formation and crystallization of the sodium salt of hexachlorophene.

As will be clear to anyone skilled in the art, these processes are tedious, time consuming, and expensive and may require additional raw materials, solvents and processing steps, all of which are disadvantageous in that they increase processing costs or decrease production capacity and production rate.

It would therefore be desirable to provide a method which would selectively remove the trichlorophenol impurity without the necessity for substantially adding to the number of process steps.

The use of molecular sieves as purifying agents is well known. Such agents have long been utilized for the removal of water from organic solvents particularly where it is desirable to use other than chemical means for the removal of the last traces of water. Molecular sieves have also been used in the petroleum industry for separating straight chain hydrocarbons from branch chain hydrocarbons. In this procedure a mixture of straight chain and branch chain hydrocarbons is introduced under pressure into a chamber containing the molecular sieves which adsorb the straight chain hydrocarbons and permit the branch chain hydrocarbons to pass through the tower. Upon removal of the pressure the straight chain hydrocarbons are released and may thus be collected.

The general theory of operation of molecular sieves postulates that the molecular sieves contain pores of fairly predictable diameter. These pore diameters range from about 3 angstrom units to about 15 units, and within any given sample of molecular sieve the variation in diameter of the pores is usually of the order of 1 angstrom unit or less. In order for a molecular sieve to perform its adsorbent function the pore size should be sufficiently great to just permit the entry thereinto of the material which is to be abstracted. Once in the pores, under stable conditions of temperature and pressure, the surface forces operating within the molecular sieve will hold the molecules which have entered and will not release them until external conditions, i.e. temperature or pressure are altered sufficiently to break the absorptive bonding thus produced.

The pore size required to adsorb a given molecule may not be accurately predicted, even though at first glance such prediction would appear possible. For example, it is possible to build a molecular model and measure the molecular dimensions thereof. It is also possible to obtain a crystalline sample of the material in question and by means of X-ray crystallography very accurately measure the molecular dimensions thereof. While these measurements appear most attractive as predictors, they are not, in fact, determinative. The reasons for the substantial discrepancies found between the theoretical and X-ray measurements and the dimensions of molecular sieves required to admit them lies in the variations in diameter which occur in practical environments which are not predictable. For example, while it is known that solvents will affect the configuration of a molecule the actual effect is usually not known. Furthermore, while a molecule may be packed in a particular crystalline form in the solid state, it is well known that for many compounds different crystalline states exist which have different packing dimensions. Similarly in the liquid state and in the gaseous state, it would be presumed that the orientation of the atoms in a molecule will vary, also in an unpredictable manner. Thus, in practice, it is found that a molecular sieve will often adsorb materials which are theoretically too large to fit into the pores, and conversely will not adsorb materials which are theoretically large enough to be adsorbed.

SUMMARY OF THE INVENTION

It has been found that molecular sieves having pore dimensions of between about 10 angstroms to about 7 angstroms, preferably between 9 angstroms and 8 angstroms will selectively remove trichlorophenol from a solution of hexachlorophene in any commonly utilized solvent. Thus, a solution containing 5,000 p.p.m. of trichlorophenol in the presence of a 5% solution of hexachlorophene will, upon treatment in accordance with the procedures of the present invention, yield a solution of approximately the same strength of hexachlorophene containing about 700 p.p.m. of the trichlorophenol.

It is the surprising finding of the present invention that trichlorophenol which has a theoretical (minimum ellipse generated by projected shadow) dimension of 3.4 by 7.6 angstroms is very slightly adsorbed by a molecular sieve having pore dimensions of 6+ by 7+ angstroms whereas hexachlorophene having similar theoretical dimensions of 7.6 by 9.2 angstroms is substantially completely unadsorbed by molecular sieves having dimensions between 9 and 10 angstroms which are substantial adsorbents of trichlorophenol.

While optimum results are obtained by batchwise treatment of solutions of hexachlorophene in standard process solvents with the appropriate molecular sieves for periods of up to 24 hours, industrially acceptable preferential adsorption of trichlorophenol from hexachlorophene is obtained by continuous trickle bed treatment of such solutions passing over the molecular sieve.

DESCRIPTION OF THE PREFERRED EMBODIMENTS

In the process of the present invention, 2,4,5-trichlorophenol (hereinafter TCP) which is a starting material in the production of hexachlorophene and is present as a contaminant in commercially produced hexachlorophene, is removed from hexachlorophene to the extent that its odor can no longer be detected, by treating a solution of hexachlorophene contaminated with TCP with molecular sieves. The molecular sieves utilized may have pore dimensions of between about 7 angstroms to about 10 angstroms, however superior results are obtained when the pore diameter lies between 8 angstroms and about 9 angstroms. The molecular sieves which may be utilized in the present process fall in the broad categories known as faujasites and mordenites. The faujasites may be alkali metal, alkaline earth metal, rare earth, ammonium, or hydrogen faujasites. The preferred types being SK-500, type Y, and sodium type Y faujasites (Linde Division, Union Carbide Corporation). The preparation of these sieves is disclosed in one or more of the following U.S. patents: 2,882,243, 2,882,244, and 3,130,007. Especially preferred in this group is the sodium type Y faujasite sieve.

Mordenite sieves (manufactured by the Norton Company) while operative in the process of the present invention do not give such satisfactory results as the faujasite sieves. It is believed that the lesser efficiency of the mordenite is due to substantially smaller pore size. However, if desired, the pore size of molecular sieves may be increased by methods well known in the art, such as leaching with strong alkali, for limited periods. While certain of the aforementioned molecular sieves are preferred to carry out the process of the present invention the use of any molecular sieve having proper dimensions to occlude TCP are considered to be within the scope of the present invention.

A very wide range of solvents may be utilized to carry out the process of the present invention. Any solvent system which will readily dissolve TCP and hexachlorophene, and will not radically corrode the molecular sieves utilized in the process, may be employed. Thus there may be used dialkyl ketones such as acetone, alkanols, suitably lower alkanols, such as methanol or ethanol, aromatic hydrocarbons such as benzene, alkylated aromatic hydrocarbons such as toluene, or xylene, haloenated alkanes, such as methylene chloride or ethylene chloride, as well as other solvents commonly used in industrial processes for example dimethylformamide, dimethylsulfoxide, acetonitrile, and the like. Especially preferred among these solvents is ethylenedichloride, since this solvent is commonly utilized in the commercial scale production of hexachlorophene, thus obviating the need for transferring the commercial product into another solvent. Methanol has also been found very useful.

It has also been found that the TCP can be separated from the hexachlorophene when both components are in ionic, that is to say, in aqueous solution when salts have been formed thereof. Among the salts which are water-soluble are the salts of alkali metal hydroxides and ammonia. In this mode of separation the appropriate salt mixture is formed by treatment with strong alkali or concentrated ammonia solution, the salt separated and taken up in a more dilute aqueous solvent, suitably dilute sodium hydroxide, dilute sodium carbonate, dilute ammonia, or basic organic solvents such as primary, secondary or tertiary amines, among which may be mentioned, without any particular preference, pyridine and triethylamine. Lower alkanols such as methanol or ethylene glycol also dissolve TCP and hexachlorophene salts. For reasons of ease of handling among the basic solvents, dilute (say approximately 1/10 normal) aqueous sodium hydroxide is preferred. The mode of proceeding with the purification in the case of the aqueous or basic solvents is substantially similar to that utilized in the case of the organic solvents and in the discussions hereinbelow no differentiation will be made between the two solvent systems except where obvious differences are necessary to be pointed out. It should be noted however that where aqueous or organic basic solvents are used the strength of the solvent should be well below that required to erode the pore size of the molecular sieve.

The method of removal of the TCP from a solution containing hexachlorophene and TCP may be carried out either by the batch system or by the continuous flow system. The mode employed depends upon factors which are well known in purification and manufacturing arts, that is to say, that while the batch-wise system generally gives the better results per single run, longer times are required and batch-wise operation is not usually desired on an industrial scale where the through-put is large enough to justify continuous flow methods. On the other hand, it is recognized that continuous flow methods are not as efficient per run as the batch-wise methods, however, they are far more rapid and more easily adaptable to large scale continuous production. Furthermore, by running the solution to be purified through more than one molecular sieve bed, satisfactory degrees of purification are obtained.

It will be understood by those skilled in the art that the extractive power of the molecular sieves for each unit of weight thereof is finite, therefore where a large amount of molecular sieves is used for a given solution, the speed of removal, and the total amount of removal will be greater than when lesser amounts are used. Furthermore, it will be equally clear to one skilled in the art that where the ratio of contaminant to desired product is large substantial amounts of molecular sieve will be required to reduce the quantity of contaminant present to the predetermined acceptable level.

It should be borne in mind therefore, that the purpose of the present invention is to remove a contaminant present in fairly constant amounts in production runs of hexachlorophene, and that the amounts of components utilized and considered in the process of the present invention are those which would be expected to be found in production runs of hexachlorophene.

These conditions generally call for a solution containing of the order of 5% to 35% total solids wherein between 1 and 5% of the total solids (i.e. between about 5,000 to about 1,000 p.p.m. of total solution) is TCP. It has been found that under these conditions the level of TCP may be reduced to an acceptable (i.e. undetectable by odor) level by treatment with substantially any ratio by weight of molecular sieve relative to weight of solution. Especially preferred is the ratio lying between about 5 and about 20%. The temperature at which the reaction is carried out is not critical. However, somewhat elevated temperatures have been found to give satisfactory results in acceptable contact times. Thus, while the purification procedure is operable at any temperature up to the reflux temperature of the solvent at atmospheric pressure, it has been found most convenient to operate at temperatures of the order of 40 to 80° C. This temperature range is preferred because it permits a reasonably rapid degree of extraction without the necessity of either reflux apparatus or pressure apparatus which would be required at more elevated temperatures. Nevertheless, conditions of reflux and elevated temperatures under pressure are to be considered as within the scope of the present invention.

In carrying out the process of the present invention the predetermined charge of molecular sieves is added to the solution which it is desired to purify. The solution is agitated for from about 2 to about 12 hours at the desired temperature. Generally speaking, it has been found satisfactory to operate at between 40° C. to about 60° C. for about 3 to about 6 hours. The treated solution is then separated from the molecular sieves. It has been found desirable, though by no means critical, to carry out this separation in two steps. In the first step, the reaction mixture is filtered through a coarse filter, such as, for example, a wide pore sintered glass plate. The bulk of the molecular sieves are thus removed. The filtrate will contain a suspension of finally divided particles of the molecular sieves caused by the agitation of the reaction mixture. The filtrate containing the particles is then filtered through a substantially fine pore filter medium. A particulate filter medium such as zeolite, supercel, fuller's earth, or the like, may be employed. However fine pore sintered glass filter plates may also be employed. The solvent is removed from the filtrate and the product crystallized in the usual manner.

In the continuous flow process, the molecular sieves are placed in a heated, sintered glass filtering apparatus and the hexachlorophene solution contaminated with TCP is slowly trickled therethrough. It will be recognized by those skilled in the art that the efficiency of this procedure will depend not only on the absolute ratio of sieve to solution but also upon the rate and efficiency of contact of the solution to the sieves. It has been found that utilizing the type of solution discussed hereinabove, approximately 40% of the TCP originally present is removed by a throughput of about 100 cc. per hour passing over 50 cc. of molecular sieve. It will thus be clear to those skilled in the art that increasing the ratio of sieve to solution will increase the efficiency of clean-up.

EXAMPLE I

A 10% 2,4,5-trichlorophenol (TCP) in dry ethylene dichloride solution was prepared and heated to 75° C. A cooling condenser trapped and refluxed any vapors. A weighed amount (25.0 grams) of Linde 4 A. molecular sieves was added to 100 gm. solution. Samples were taken every ½ hour for 5 hours. Concentration of TCP in ethylene dichloride remained at 10 to 10.5% throughout the run.

EXAMPLE II

A 10% solution of TCP in dry ethylene dichloride (100 g.) is prepared in accordance with the conditions of Example I and treated with 5 A. Linde sieves (25 g.). Sampling at ½ hour intervals over 5 hours showed the concentration of TCP in ethylene dichloride *increased* from 10% to 11.5%.

This result indicates that solvent was preferentially adsorbed but TCP was excluded from the sieve and that TCP showed an apparent increase in concentration as solvent was "removed."

EXAMPLE III

A 10% solution of TCP in ethylene dichloride (100 gm.) was treated with 25 gm. of Linde SK–500 (9 A– 10 A.). An equilibrium appeared to be reached in ½ hour. The concentration of TCP in ethylene dichloride was reduced from 10% to 7.2% and it remained constant over a 4 hour period.

EXAMPLE IV

A standard test solution was made up by (a) weighing on an analytical balance 1.000 gm. of 'hexachlorophene grade" TCP, (b) 99.0 gm. of U.S.P. hexachlorophene and (c) adding both (a) and (b) to 1900 gm. of predried ethylene dichloride. The final make up solution was 0.05 wt. percent TCP and 4.95 wt. percent hexachlorophene but was analyzed as 0.074 wt. percent TCP and 5.5 wt. percent hexachlorophene.

"Hexachlorophene grade" TCP is specified as follows:

(a) Snow white flakes: A solution of 5.0 gm. of the 2,4,5 TCP dissolved in 100 ml. of 95% ethonol is not darker than color No. 5 (0.0011 gm. $K_2CR_2O_7$ per 100 ml. of 2% $H_2SO_4$).

(b) Congealing point: 63.5° C. minimum.

(c) Sulfuric acid discoloration (2 gm. TCP in 20 ml. of 97% $H_2SO_4$)—maximum optical density in a test tube for acceptable product=0.200.

(d The gas chromatography assay on a lanolin 20% Chromosorb W60/80, 80%, 2 meters long, 4 mm. I.D. at 215° C. with helium flow on an F&M 720 thermal conductivity detector instrument will analyze:

| | |
|---|---|
| 2,4,5 trichlorophenol | 99% minimum. |
| Tetrachlorobenzene | 0.5% maximum. |
| 2,5 dichlorophenol | 0.3% maximum. |
| 2,3,6 trichlorophenol | 0.8% maximum. |

EXAMPLE V

The solution of Example IV was divided into 2 equal parts, 1A and 1B. Part 1A was analyzed untreated and part 1B (1,000 gm.) was treated with 20 gm. of Linde SK–500 sieves at 50° C. for 3 hours.

Table III details the results obtained.

EXAMPLE VI

Two additional samples of solutions of TCP and hexachlorophene in ethylene dichloride prepared in accordance with Example IV, were divided into standard and treatable portions and treated for up to 4 hours at 40° C. with varying ratios of SK–500 per unit sample weight. Samples 2A and 3A are standard (untreated) while samples 2B, 2C, 2D, 2E, 3B, 3C, 3D, and 3E are treated. Results are compiled in Table III and show that up to 60% of the TCP present in solution was removed without lowering the initial hexachlorophene concentration.

EXAMPLE VII

Standard ethylene dichloride test solutions of TCP plus hexachlorphene were made up in accordance with Example IV analyzing 0.068% TCP and 4.29% hexachlorophene (Table IV, sample 4A). Treatment with the H-mordenite (decationated) sieve according to Table IV, samples 4B and 4C showed a percent reduction of TCP relative to hexachlorophene of up to 12%.

EXAMPLE VIII

Standard ethylene dichloride test solutions of TCP plus hexachlorophene were made up in accordance with Example IV analyzing 0.064% TCP, and 4.67% hexachlorophene. Treatment with the sodium form of mordenite (NA-mordenite) resulted in no net reduction of TCP from the ethylene dichloride-hexachlorophene solution (Table IV).

TABLE III.—SK-500 SIEVE TREATMENT

| Sample No. | Remarks | Solution wt. (gm.) | Sieve wt. (gm.) | Wt. ratio sieve/ solution | Time of treatment, hours | Temp. of treatment, °C. | Analytical results, percent | | Percent reduction of original TCP |
|---|---|---|---|---|---|---|---|---|---|
| | | | | | | | TCP | Hexa- chloro- phene | |
| 1A | Untreated standard sample | 1,000 | 0.0 | 0.0 | 0 | | [1] 0.074 | [1] 5.5 | 0.0 |
| 1B | Treated | 1,000 | 20.0 | 0.02 | 3 | 50 | 0.058 | 5.4 | 21.6 |
| 2A | Untreated standard sample | 500 | 0.0 | 0.0 | 0 | | [1] 0.074 | [1] 5.9 | 0.0 |
| 2B | Treated | 500 | 20.0 | 0.04 | 1 | 40 | 0.058 | 6.0 | 21.6 |
| 2C | do | 500 | 20.0 | 0.04 | 2 | 40 | 0.052 | 5.8 | 29.8 |
| 2D | do | 500 | 20.0 | 0.04 | 3 | 40 | 0.045 | 6.0 | 39.2 |
| 2E | do | 500 | 20.0 | 0.04 | 4 | 40 | 0.45 | 5.8 | 39.2 |
| 3A | Untreated standard sample | 250 | 0.0 | 0.0 | 0 | | [1] 0.074 | [1] 5.5 | 0.0 |
| 3B | Treated | 250 | 19.2 | 0.077 | 1 | 40 | 0.045 | 5.5 | 39.2 |
| 3C | do | 250 | 19.2 | 0.077 | 2 | 40 | 0.036 | 5.5 | 51.3 |
| 3D | do | 250 | 19.2 | 0.077 | 3 | 40 | 0.301 | 5.5 | 58.1 |
| 3E | do | 250 | 19.2 | 0.077 | 4 | 40 | 0.029 | 5.5 | 60.9 |

[1] All untreated standard samples were made up at 0.050% TCP and 4.95% hexachlorophene.

TABLE IV.—MORDENITE H AND NA SIEVE TREATMENT

| Sample | Remarks | Wt. solution | Wt. sieve | Wt. ratio sieve/ solution | Treatment time, hours | Analytical results, percent | | Percent reduction of original TCP |
|---|---|---|---|---|---|---|---|---|
| | | | | | | TCP | Hexa- chloro- phene | |
| 4A | H-mordenite untreated | 400 | 0 | 0 | 0 | [1] 0.068 | [1] 4.29 | 0.0 |
| 4B | H-mordenite treated | 400 | 20 | .05 | 1 | 0.060 | 4.08 | 12 |
| 4C | do.[2] | 400 | 20 | .05 | 2 | 0.064 | 4.02 | 6 |
| 5A | NA-mordenite untreated | 400 | 0 | 0 | | [1] 0.064 | [1] 4.67 | 0.0 |
| 5B | NA-mordenite treated | 400 | 20 | .05 | 1 | 0.064 | 4.12 | 0.0 |
| 5C | do.[3] | 400 | 20 | .05 | 2 | 0.066 | 4.08 | 0.0 |

[1] Test solutions are carefully made up 0.051% TCP, 4.95% hexachlorophene.
[2] After run #4 a material balance showed a loss of only 1.6 gm. ED by evaporation. Final sieve wt. after drying was 26.6 gms.
[3] After run #5, a material balance showed a loss of only 2.2 gm. Final sieve wt. after vacuum drying was 24.3 gm.

EXAMPLE IX 99.0 gm. of U.S.P. hexachlorophene and 1.0 gm. TCP are dissolved in 2000 gm. dried ethylene dichloride to make a standard solution. Part of the standard solution (125 gm.) is treated with 25 gm. of Linde sodium faujasite (NA-Y) molecular sieves. The slurry of sieves plus solution is agitated for three hours with samples of solution being taken for analysis every hour. Results are described in Table V. Up to 88% of the TCP present in solution was removed with no net reduction in initial hexachlorophene concentration.

TABLE V.—TREATMENT WITH SODIUM FAUJASITE

| Sample number | Description | Weight percent | | Percentage removed of TCP |
|---|---|---|---|---|
| | | TCP in ethylene dichloride | Hexa- chlorophene in ethylene dichloride | |
| 1 | Standard untreated solution. | 0.053 | 5.45 | 0.0 |
| 2 | Treated one hour | 0.020 | 5.6 | 63 |
| 3 | Treated two hours | 0.012 | 5.5 | 77.4 |
| 4 | Treated three hours | 0.009 | 5.7 | 83.6 |
| 5 | Treated overnight | 0.007 | 5.6 | 88 |

EXAMPLE X

Hexachlorophene was formed in a laboratory reaction by reacting TCP and paraformaldehyde in an ethylene dichloride solvent with oleum in the following manner: 3220 gm. ethylene dichloride and 1500 gm. TCP are charged to a reactor, 685 gm. of 20% oleum are then charged into the reaction flask which is agitated and heated to 72° C. 121.6 gm. paraformaldehyde is fed to the reactor over 1.5 hours, keeping temperature at 74° C. by external cooling. The mixture is heated under reflux slowly for 1.5 hours more. At this time an additional 3120 gm. of hot ethylene dicholride is added to the reaction vessel, agitated 2 minutes and heated to reflux for 15 minutes. Reflux is stopped and the mixture allowed to settle for one hour. The lower acid layer is drained into a separate vessel and the organic layer is decolorized. Trace acids remained in the organic solution. The reacted hexachlorophene (15.7% by weight) in ethylene dichloride solution was treated as follows in Example XI.

EXAMPLE XI

A fifty gram (about 50 cc.) sample of tableted Linde NA-Y sieves was placed inside a heated, fritted glass filtering apparatus. The hexachlorophene solution (500 cc. or 620 gm.) was continuously fed through the tableted, sieve trickle-bed with an average calculated exposure time of 30 minutes. In other words, the solution through-put was 100 cc./hr./50 cc. sieve or 2.48 gm. solution per cc. sieve per hour.

Table VI details the results of analyzing effluent solutions from the treatment. The process was run continuously for 5 hours.

TABLE VI.—CONTINUOUS TREATMENT OF ACTUAL HEXACHLOROPHENE PROCESS SOLUTION

| Sample number | Average treatment time (min.) | Hours sampled after process begun | W./w. percent | | Percent TCP | |
|---|---|---|---|---|---|---|
| | | | Hexa- chlorophene in ethylene dichloride | TCP in ethylene dichloride | TCP and hex. (solvent free basis) | Re- moved |
| 1 | 0 | [1] 0 | 15.7 | 0.080 | 0.51 | 0 |
| 2 | [2] 15 | 0.5 | 14.6 | 0.061 | 0.41 | 18 |
| 3 | 30 | 1.0 | 15.6 | 0.050 | 0.32 | 37 |
| 4 | 30 | 2.0 | 18.8 | 0.058 | 0.31 | 39 |
| 5 | 30 | 3.66 | 20.2 | 0.062 | 0.31 | 39 |
| 6 | 30 | 4.0 | 15.1 | 0.039 | 0.30 | 41 |
| 7 | 30 | 5.0 | 13.0 | 0.032 | 0.27 | 47 |

[1] Untreated material.
[2] Steady state conditions not yet established.

An analysis of Table VI illustrates the continuous selective removal of TCP from hexachlorophene process solution.

Other examples which illustrates the use of this invention in solvents other than ethylene dichloride or with one or any soluble salt of the TCP and hexachlorophene are additionally included.

EXAMPLE XII

To 250 gm. acetone is added 12.5 gm. U.S.P. hexachlorophene (containing .0125 gm. TCP) and an additional 0.150 gm. TCP which dissolve. The solids content would measure 1.28% TCP on a solvent free basis. The solution is placed in a 500 ml. 3 necked flask and agitated. To the solution is added 25 gm. of Linde molecular sieves 'sodium type Y faujasites," ⅛" tablets. The slurry is then agitated for 4 hours. The solution is filtered through Super-Cel on a fritted glass filter to remove sieve powder due to tablet attrition. The solutions are placed in an evaporating dish at room temperature to remove solvent overnight. The solids are analyzed on a solvent free basis and contain 1.02% TCP.

EXAMPLE XIII

To 250 gm. benzene is added 12.5 gm. U.S.P. hexachlorophene (containing 0.0125 gm. TCP) and an additional 0.150 gm. TCP which dissolve on heating to 65° C. Then 25 gm. of Linde molecular sieve "sodium type Y" faujasites are added as ⅛" tablets. The slurry is agitated for 4 hours. The solution is filtered as in Example XIII and likewise dried and analyzed. The solids are analyzed on a solids-free basis as containing 0.47% trichlorophenol.

EXAMPLE XIV

To 250 gm. methanol is added 12.5 gm. U.S.P. hexachlorophene (containing .0125 gm. trichlorophenol) and an additional 0.150 gm. TCP which are agitated and dissolved. Then 25 gm. of Linde sodium type Y faujasite molecular sieves as ⅛" tablets are added. The slurry was agitated for 4 hours, filtered and dried as in Example XII and analyzed for hexachlorophene and TCP. The analysis of this sample on a solvent free basis was 0.37% trichlorophenol, indicating over 70% of the trichlorophenol was selectively removed from this sample.

EXAMPLE XV (a) Five grams of trichlorophenol are dissolved in a slight excess of 5% NaOH and the sodium trichlorophenolate was recovered by evaporating to dryness. (b) A 2.5% NaOH solution was used to dissolve 20 gm. of hexachlorophene. On a partial evaporation the hexachlorophene sodium salt crystals were caked and collected by filtration. The cake was evaporated to dryness.

A solution of 12.5 gm. of the sodium salt of hexachlorophene and 0.150 gm. of the TCP salt of the TCP sodium salt in 250 gm. of methanol was prepared by heating the mixture to 60° C. Then 25 gm. of Linde sodium Y faujasite sieves were added and agitation was continued for 4 hours. The batch was filtered over Super-Cel and the sieve-free solution placed in an evaporating dish overnight.

The solids were analyzed for percent sodium-TCP on a solvent free basis. Results indicated only 0.43% sodium TCP was present in the sodium hexachlorophene sample compared to the 1.19% TCP salt in the prepared sample before treatment.

EXAMPLE XVI

Comparison of sieve treated hexachlorophene solutions with untreated solutions when the solvent and free TCP are removed by crystallization followed by air-drying A solution (I) was made up consisting of 2000 gm. ethylene dichloride, 99.0 gm. hexachlorophene and 1.00 gm. of TCP. The solids content is nominally 1% TCP on a solvent-free basis.

(a) Three hundred (300) grams of solution I was crystallized. The solid from the evaporated solution was further dried in air. The solid sample recovered analyzed 5000 p.p.m. of TCP.

(b) 600 gm. of solution (I) was treated with 120 gm. of Linde "sodium Y" molecular sieves (⅛" tablets), by agitation for 3 hours at 50° C. The solution was filtered to remove the sieves. The solution was divided into two portions. One portion, A, was air dried overnight. The second, B, was washed with hot (75° C.) water and then dried overnight.

Sample A was analyzed by the VPC method to be 660±250 p.p.m. TCP while sample B analyzed 775±25 p.p.m. TCP. Both samples were free from the characteristic medicinal odor caused by TCP.

What is claimed is:

1. A process of removing trichlorophenol from hexachlorophene which comprises treating at an elevated temperature up to and including reflux, a solvent solution of hexachlorophene contaminated with trichlorophenol with a molecular sieve selected from the group consisting of rare earth-, alkali-, alkaline earth-, ammonium- and hydrogen-faujasites and hydrogen mordenite having a pore size greater than 7 A. and less than 10 A.

2. A process according to claim 1 wherein the pore size of the sieve is betwen about 9 A. and about 8 A.

3. A process according to claim 1 wherein the solvent is an organic solvent for the components or an aqueous basic solution capable of dissolving alkali metal or ammonium salts provided the pH of said basic solution is insufficiently high to attack the molecular sieve.

4. A process according to claim 3 wherein the organic solvent is selected from the group consisting of dialkyl ketones, lower alkanols, aromatic hydrocarbons, alkylated aromatic hydrocarbons, and halogenated alkanes.

5. A process according to claim 4 wherein the solvents are selected from the group consisting of acetone, methanol, benzene, toluene, and ethylene dichloride.

6. A process according to claim 3 wherein the aqueous solvents are dilute aqueous alkali metal hydroxides or ammonium hydroxide.

7. A process according to claim 2 wherein the contaminated solution is fed through a bed of the molecular sieve.

8. A process according to claim 2 wherein the contaminated solution is treated with between about 5 to about 20% by weight of the molecular sieve.

9. A process according to claim 2 wherein the contaminated solution is treated with the sieve at the temperature of between about 40 and about 80° C.

References Cited

UNITED STATES PATENTS

| | | | |
|---|---|---|---|
| 3,179,703 | 4/1965 | Rieman III | 260—623 R X |
| 2,861,948 | 11/1958 | McKellar | 260—623 R UX |
| 3,496,239 | 2/1970 | Hamilton et al. | 260—619 A |
| 3,371,110 | 2/1968 | Hamilton et al. | 260—623 R X |

OTHER REFERENCES

Hersh: Molecular Sieves (1961), pp. 78–84.

BERNARD HELFIN, Primary Examiner